United States Patent
Osanai et al.

(10) Patent No.: US 7,689,776 B2
(45) Date of Patent: Mar. 30, 2010

(54) METHOD AND SYSTEM FOR EFFICIENT CACHE LOCKING MECHANISM

(75) Inventors: Takeki Osanai, Kanagawa (JP); Kimberly Fernsler, Round Rock, TX (US)

(73) Assignees: Kabushiki Kaisha Toshiba, Tokyo (JP); International Business Machines Corporation, Armonk, NY (US)

(*) Notice: Subject to any disclaimer, the term of this patent is extended or adjusted under 35 U.S.C. 154(b) by 594 days.

(21) Appl. No.: 11/145,844

(22) Filed: Jun. 6, 2005

(65) Prior Publication Data

US 2006/0277351 A1  Dec. 7, 2006

(51) Int. Cl.
G06F 12/10 (2006.01)
G06F 12/12 (2006.01)

(52) U.S. Cl. ............ 711/145; 711/207; 711/133; 711/E12.061; 711/E12.072

(58) Field of Classification Search ............ None
See application file for complete search history.

(56) References Cited

U.S. PATENT DOCUMENTS 6,732,250 B2 * 5/2004 Durrant ............ 711/202
6,754,784 B1 * 6/2004 North et al. ............ 711/145
2002/0069327 A1 * 6/2002 Chauvel ............ 711/130
2002/0069827 A1 * 6/2002 Sakamoto et al. ......... 118/723.001

FOREIGN PATENT DOCUMENTS

JP  10-320285  12/1998

* cited by examiner

Primary Examiner—Denise Tran
(74) Attorney, Agent, or Firm—Sprinkle IP Law Group (57) ABSTRACT

Systems and methods for the implementation of more efficient cache locking mechanisms are disclosed. These systems and methods may alleviate the need to present both a virtual address (VA) and a physical address (PA) to a cache mechanism. A translation table is utilized to store both the address and the locking information associated with a virtual address, and this locking information is passed to the cache along with the address of the data. The cache can then lock data based on this information. Additionally, this locking information may be used to override the replacement mechanism used with the cache, thus keeping locked data in the cache. The translation table may also store translation table lock information such that entries in the translation table are locked as well.

14 Claims, 5 Drawing Sheets

METHOD AND SYSTEM FOR EFFICIENT CACHE LOCKING MECHANISM

TECHNICAL FIELD OF THE INVENTION

The invention relates in general to methods and systems for cache management, and more particularly, to efficient implementations of cache locking.

BACKGROUND OF THE INVENTION

In recent years, there has been an insatiable desire for faster computer processing data throughputs because cutting-edge computer applications are becoming more and more complex, placing ever increasing demands on microprocessing systems. The microprocessors in these systems may have very rapid cycle times and be capable of manipulating a great amount of data very quickly. The time to access the DRAM memories to which these microprocessors are coupled, however, may be considerably higher than the cycle time of the microprocessor and can vary dramatically based on the extant conditions at the time of the memory access.

In order to ameliorate the bottleneck imposed by the relatively long and variable access time to memory, memory hierarchies utilizing cache memories have been implemented in conjunction with microprocessors. Cache memory augments the data storage function of main memory by providing data storage that is significantly faster than DRAM memory and which provides consistent access times.

Due to the relatively high cost of cache memories, however, they are typically much smaller than main memory. Consequently, conventional replacement algorithms have been employed to determine what data should be stored in the cache memory. Most of these algorithms fill and replace elements within the cache according to some fixed policy, such that data is rotated in and out of the cache based on this policy.

Occasionally, however, programmers who design applications for these microprocessor systems wish certain critical memory contents to remain in the cache in order to guarantee fixed cycles of latencies to access these critical memory contents. Cache locking allows some or all of the contents of the cache to be locked in place, unsusceptible to the cache replacement policy implemented on the system. This ability to lock the cache is available on several microprocessors, such as the PowerPC, some Intel x86 processors the Motorola MPC7400 etc., and may allow static locking of the cache (cache is loaded and locked at system start) and dynamic locking (the state of the cache may change during execution). While cache locking may decrease the performance of the cache, it allows programmers to more accurately predict a worse case access time for a piece of data; particularly important in designing mission critical systems.

Typically, however, the systems and methods utilized to lock the cache may require a large overhead. For example, in one implementation, to lock data elements within the cache a programmer may set the effective address of the data to be locked to a first register for managing a locked cache, and the set information for the set (way) of the cache to be locked to a second register for managing a locked cache. The first access to the effective address (or the virtual address) located in the first register may generate a cache reload to the set (way) of the cache pointed to by the second register. Subsequently, however, the hardware will not replace the cache entry referenced by the second register with other data whose address is different from contents of the second register. Thus, the critical data remains in the cache.

This technique may require that both the effective address and the real address (or the physical address) of data be maintained by the load and store queues of the cache which in turn imposes a heavy hardware penalty. In one implementation, those pair of registers to manage lock addresses is established in an L2 cache unit. For example, if an effective address is fifty-two bits long, the load queue contains four entries and the store queue is eight entries long, to implement this type of cache locking mechanism requires somewhere on the order of 624 bits. The extra flip-flops required to store these bits may occupy a relatively large area on a modern microprocessor.

Thus, a need exists for efficient systems and methods for cache locking mechanisms which reduce the overhead associated with implementing this cache locking.

SUMMARY OF THE INVENTION

Systems and methods for the implementation of more efficient cache locking mechanisms are disclosed. These systems and methods may alleviate the need to present both a virtual address (VA) and a physical address (PA) to a cache mechanism. By eliminating the need for both of these addresses, the hardware requirements needed to implement a cache locking mechanism are eased by reducing the amount of hardware utilized to store address data in various steps of the cache pipeline. A translation table is utilized to store both the address and the locking information associated with a virtual address, and this locking information is passed to the cache along with the address of the data. The cache can then lock data based on this information. Additionally, this locking information may be used to override the replacement mechanism used with the cache, thus keeping locked data in the cache. The translation table may also store translation table lock information such that entries in the translation table are locked as well.

In one embodiment a translation table is operable to store cache lock information corresponding with one or more of the entries in the translation table.

In another embodiment, this cache lock information may be used to override the replacement policy of a cache containing data associated with one of the entries.

In still another embodiment, the entries of the translation table may themselves be locked within the translation table.

Embodiments of the present invention may provide the technical advantage of reducing the amount of hardware, flip-flops and/or other logic needed to implement cache locking and make implementations of cache locking substantially faster.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illus

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Initially, a few terms are defined or clarified to aid in an understanding of the terms as used throughout the specification. The term "translation table" is intended to mean any software, hardware or combination which supports the ability to translate a virtual address into a physical address, such as a translation lookaside buffer (TLB), effective to real address translation table (ERAT) etc. By the same token, the term "virtual address" and "physical address" will be understood generically to refer to any type of virtual address and physical addresses, no matter the specific terms used with reference to a particular architecture, for example "effective address" etc. Conversely, these specific terms will be understood to be specific examples of the generic term. For example, an effective address will be a specific example of a virtual address. Additionally, these terms will be used generically no matter what size block the addresses are used to refer to, whether they be individual memory locations, word size, double word size, page size etc.

Reference is now made in detail to the exemplary embodiments of the invention, examples of which are illustrated in the accompanying drawings. Wherever possible, the same reference numbers will be used throughout the drawings to refer to the same or like parts (elements).

Before discussing embodiments of the present invention, an exemplary architecture for use in illustrating embodiments of the present invention is described. It will be apparent to those of ordinary skill in the art that this is a simple architecture intended for illustrative embodiments only, and that the systems and methods described herein may be employed with any variety of more complicated or simpler architectures in a wide variety of microprocessing systems. For example, though the systems and methods of the present invention may be described with respect to a level 2 (L2) data cache the same systems and methods are equally applicable to a level 1 (L1) cache, etc.

It will also be apparent that though the terminology used may be specific to a particular microprocessor architecture, the functionality referred to with this terminology may be substantially similar to the functionality in other microprocessor architectures. For example, an effective to real address translation table (ERAT) may be substantially equivalent to a translation lookaside buffer (TLB) or other virtual address to physical address translation or virtual page to real page translation mechanism.

Figure 1:
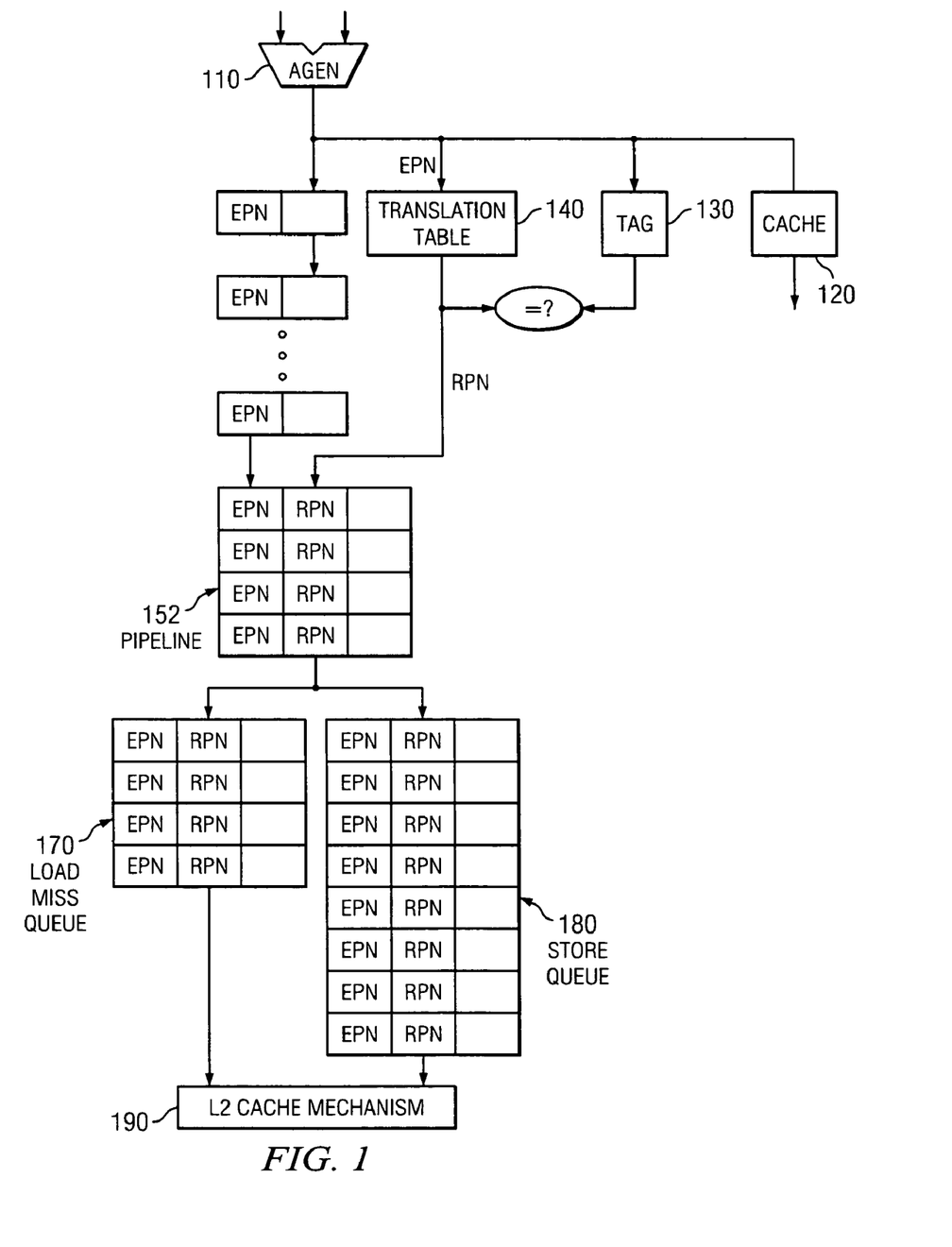
- FIG. 1 depicts a block diagram of one embodiment of a system for locking entries in a cache.

FIG. 1 illustrates just such an exemplary architecture. During an execute stage of a processor, arithmetic and operand address generation (agen) logic 110 may generate an effective address (EA) corresponding to a virtual location in memory where data related to an instruction is located, as is known in the art. This EA may be sent to L1 cache 120, tag generator 130, and translation table 140. L1 cache 120 may be a virtually indexed, physically tagged cache as is known in the art, such that the EA may be compared against entries in L1 cache 120 to determine if an entry in L1 cache 120 corresponds to the EA. Translation table 140 is capable of translating effective addresses into real addresses, as is known in the art and may be implemented in a wide variety of ways, such as translation lookaside buffers (TLBs), ERATs, etc.

Figure 2:
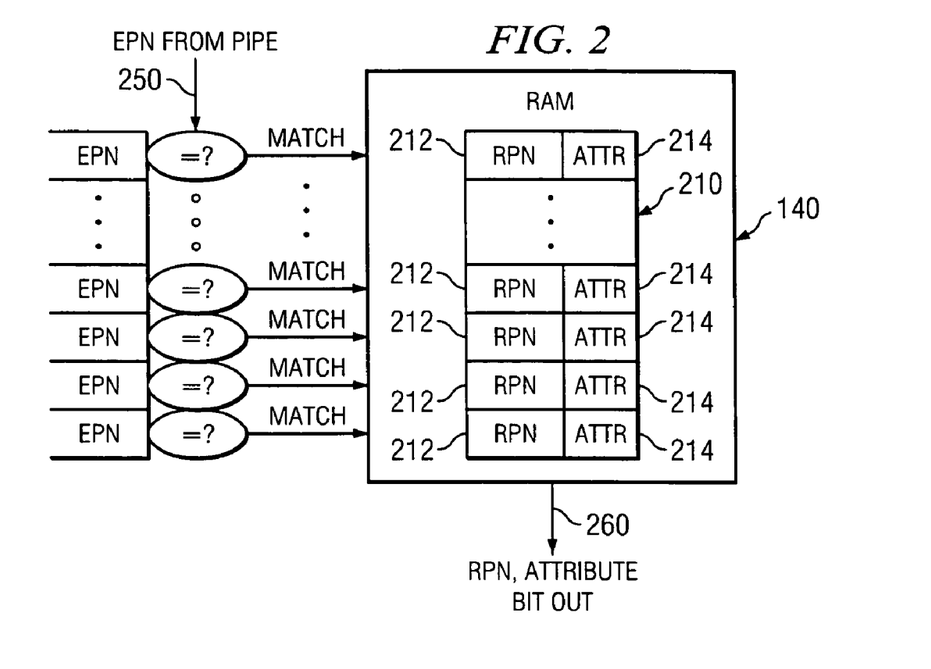
FIG. 2 depicts a block diagram of one embodiment of a translation table.

Substantially simultaneously to the EA being sent to L1 cache 120, the EA may be placed into a cache line miss buffer of cache miss transaction pipeline 152; translation table 140 translates the EA into a corresponding real address (RA); and tag bits corresponding to the EA are generated by tag generator 130 if they are available. Turning briefly to FIG. 2, one embodiment of a typical architecture for a translation table is depicted. Translation table 140 comprises storage area 210 which may be a content addressable memory capable of storing physical addresses 214 and corresponding attributes 212. When translation table 140 receives an EA on input lines 250, this EA may be used as a search key to storage area 210. If a match is found to the EA, RA 214 and attribute bits 212 corresponding to that EA are output on output lines 260.

Returning to FIG. 1, the RA 214 generated by translation table 140 is then stored in cache transaction pipeline 152 along with its corresponding EA. Entries in cache transaction pipeline 152 can then be placed in load/miss queue 170 or store queue 180 depending on the type of instruction which originally referenced EA. From load/miss queue 170 or store queue 180, an EA and a corresponding RA may be sent to L2 cache mechanism 190.

Figure 3:
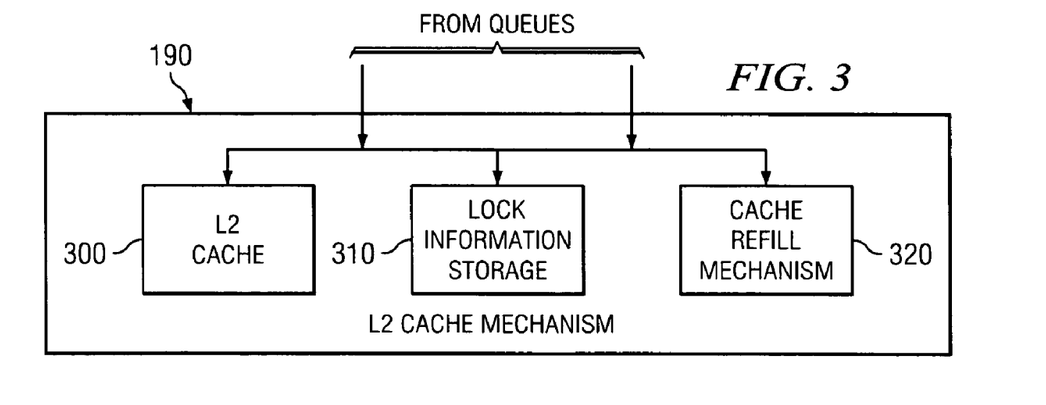
FIG. 3 depicts a block diagram of one embodiment of a cache mechanism.

FIG. 3 depicts one embodiment of an architecture for L2 cache mechanism 190. L2 cache mechanism 190 comprises L2 cache 300, lock information storage 310 and L2 cache refill mechanism 320. L2 cache 300 may store data; lock information mechanism 310 may store lock information pertaining to data within L2 cache 300 and L2 cache refill mechanism 320 may implement a replacement policy for L2 cache 300. Thus, cache mechanism 190 may implement a L2 cache capable of locking data in the cache. In one embodiment, lock information mechanism 310 may function by utilizing an EA sent from load/miss queue 170 or store queue 180, while L2 cache 300 may function based on the associated RA. When data is stored in L2 cache 300, if this data is to be locked, associated lock information is stored in lock information mechanism 310. When L2 cache refill mechanism 310 wishes to replace an entry in L2 cache 300 it checks lock information storage 310 for information pertaining to the entry it wishes to replace. If this entry is locked, L2 cache refill mechanism 320 selects a different entry of L2 cache 300 to replace.

As can be seen from FIGS. 1-3, certain implementations of a cache locking mechanism may necessitate that both the EA and RA of data be stored in entries of cache miss transaction pipeline 152, load/miss queue 170 and store queue 180 such that both the EA and the RA of data can be made available to L2 cache mechanism 190. Storing both the EA and RA, in turn, imposes heavy hardware requirements on a microprocessor.

Attention is now directed to systems and methods for the implementation of more efficient cache locking mechanisms. These systems and methods may alleviate the need to present both a virtual address (VA) (or an effective address (EA)) and a physical address (PA) (or a real address (RA)) to a cache mechanism. By eliminating the need for both of these addresses, the hardware requirements needed to implement a cache locking mechanism are eased by reducing the hardware utilized to store address data in various steps of the cache pipeline. A translation table is utilized to store both the address and the locking information associated with a virtual address, and this locking information is passed to the cache along with the address of the data. The cache can then lock data based on this information. Additionally, this locking information may be used to override the replacement mechanism used with the cache, thus keeping locked data in the cache. The translation table may also store translation table lock information such that entries in the translation table are locked as well.

Figure 4:
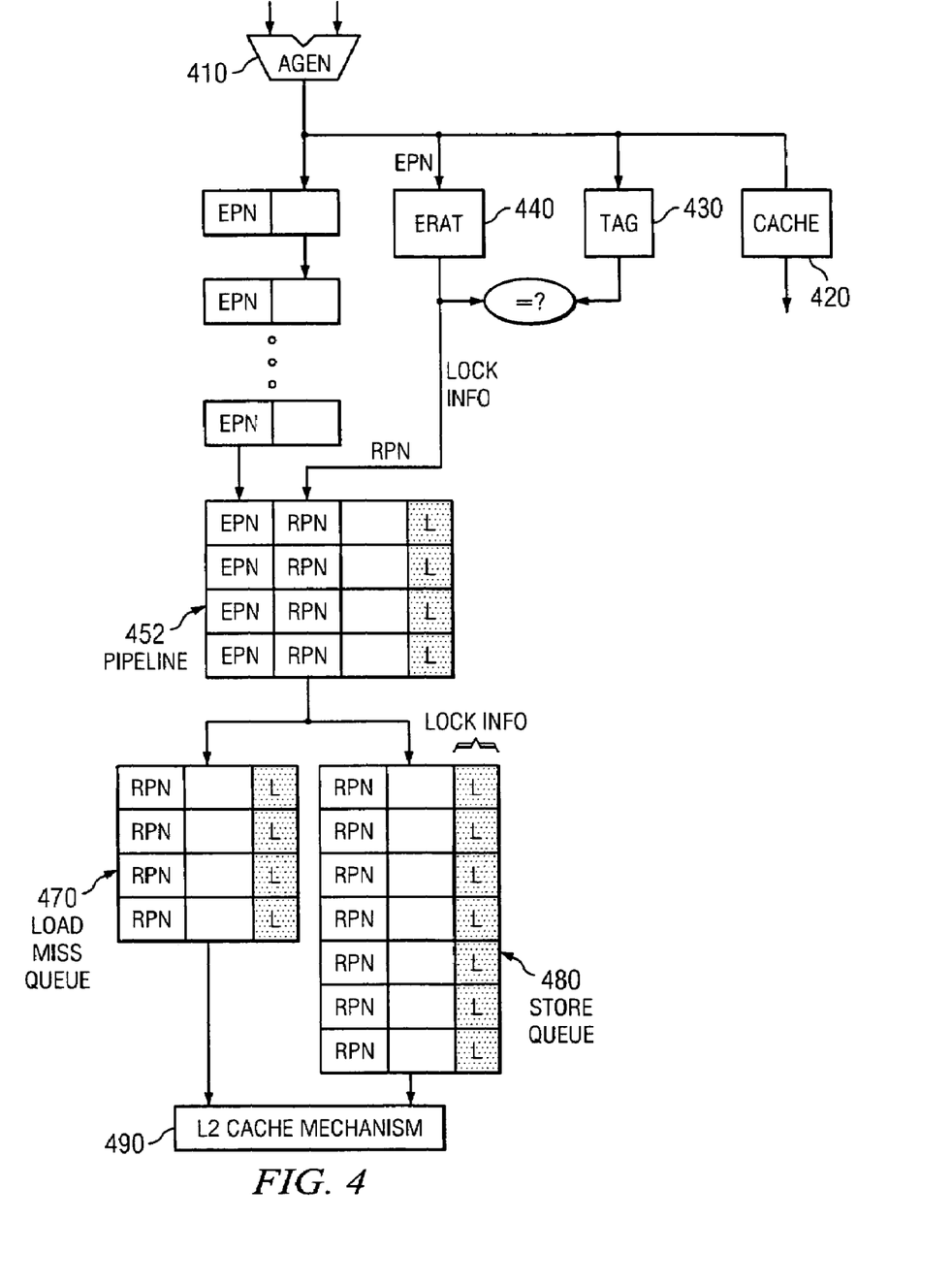
FIG. 4 depicts a block diagram of one embodiment of a system for locking entries in a cache.

FIG. 4 illustrates one embodiment of just such an architecture. During an execute stage of a processor, arithmetic and operand address generation (agen) logic 410 may generate an effective address (EA) corresponding to a virtual location in memory where data related to an instruction is located, as is known in the art. This EA may be sent to L1 cache 420, tag generator 430, and translation table 440. L1 cache 420 may be a virtual indexed cache as is known in the art, such that the EA may be looked up in the L1 cache to determine if an entry in L1 cache 420 corresponds to EA.

Substantially simultaneously to the EA being sent to L1 cache 420, the EA may be placed into a cache line miss buffer of cache miss transaction pipeline 452; translation table 440 translates the EA into a corresponding physical address (PA) and lock data; and tag bits corresponding to the EA are generated by tag generator 430 if they are available.

Figure 5:
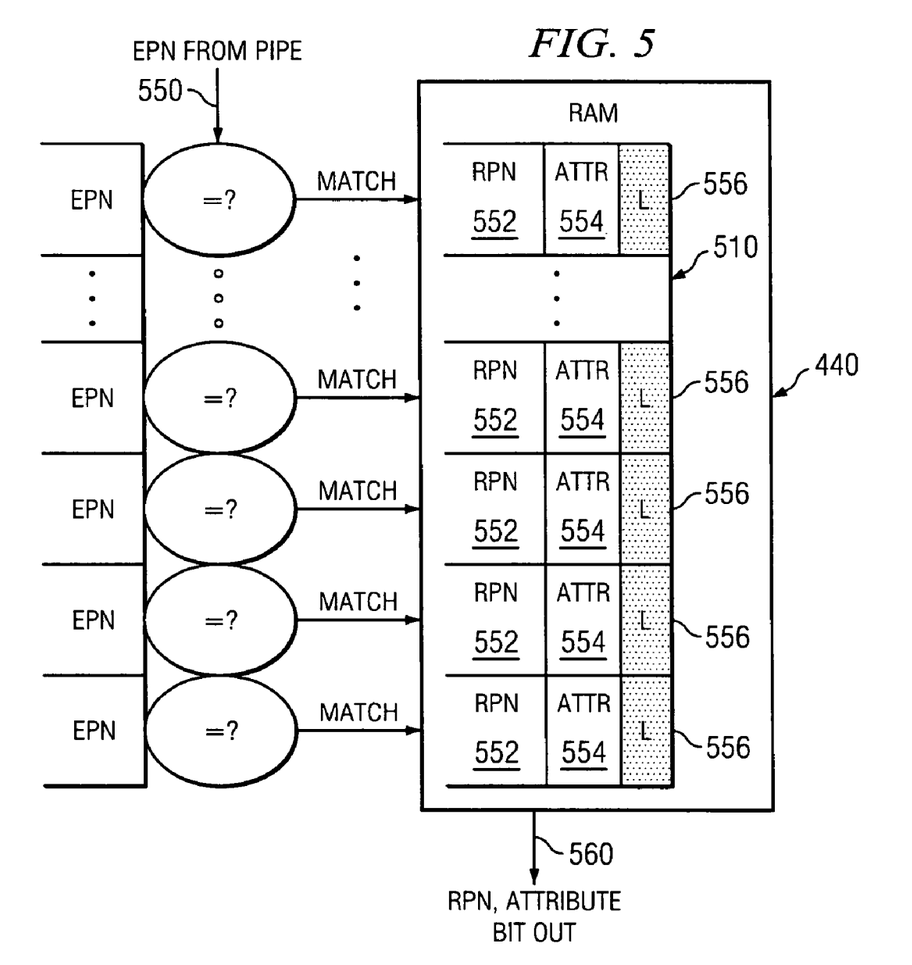
FIG. 5 depicts a block diagram of one embodiment of a translation table.

Turning briefly to FIG. 5, one embodiment of an architecture for a translation table is depicted. Translation table 440 may be a content addressable memory comprising a set of entries 550. Each entry 550 may contain a real addresses 552 and corresponding attributes 554. Attributes 554, in turn, may contain cache lock information 556, comprising bits pertaining to the locking of data corresponding to real address 552 within a cache. When translation table 440 receives an EA on input line 550, this EA may be used as a search key to storage area 510. If a match is found to the EA, the RA 552, attribute bits 554, including cache lock information 556, corresponding to EA are output on ERAT output lines 560.

In one particular embodiment, to lock information corresponding to an EA in a cache an instruction may identify an EA, and that data corresponding with this EA should be locked. This instruction may be an instruction currently within the lexicon of a microprocessor architecture or may be a new or modified instruction. For example, the definition and functionality of the "mtspr" instruction in the PowerPC architecture may be enhanced, or the "mtc0" instruction in the MIPS architecture. Additionally, this instruction may perform a "sync" function, as is known in the art, such that the context of the system is synchronized before the data is locked. This instruction may also be operable to write to, modify, or set one or more configuration registers, or read the lock information corresponding to an EA.

Upon receiving the EA and cache lock information from the instruction, translation table 440 may look at all of its valid entries 550 for a match to the EA and set lock information 556 of matching entry 550 if a match is found such that data corresponding with that entry 550 will be locked in L2 cache mechanism 490.

If no match is found to the EA, at least a portion of translation table 440 is reloaded. Upon reloading translation table 440, cache lock information 556 of reloaded entry 550 matching the EA is set based on the instruction. Alternatively, translation table 440 may automatically reload every entry of translation table 440 if no match is found to the EA. This automatic reload may, in turn, be initiated by an exception that is taken when no match to the EA provided by the instruction is found in translation table 440.

Lock information 556 may be a series of bits designating whether the data corresponding to the address is to be locked. In one particular embodiment, lock information 556 may be three bits which may designate which way of an 8-way set associative cache is to be locked.

As particular entries 550 of translation table 440 correspond to information locked within a cache, it is expected that this information will be accessed on a fairly regular basis. Consequently, it may be inefficient for entries 550 corresponding to this locked information to be overwritten or replaced with another pair of EA and RA in translation table 440. Therefore, in one particular embodiment, entries 550 also contain one or more translation table lock bits to store translation table locking information pertaining to locking entries 550 within translation table 440. These bits allow translation table 440 to lock entries 550 within translation table 440. In one embodiment, translation table 440 may lock an entry 550 containing the RA and attribute bits corresponding to the EA received from the instruction if the instruction indicates that EA is to be locked in the cache by setting these translation table lock bits. Thus, that entry 550 is not replaced by subsequent reloads of translation table 440 and subsequent accesses to the identical EA will result in line 550 being output by translation table 440 without translation table 440 having to reload any data. Conversely, when this entry 550 is invalidated it may be unlocked.

Though each entry 550 of translation table 440 may only utilize three bits per entry to store cache locking information, even this small hardware addition to translation table 440 may be deemed too costly. However, in many cases very little data is locked in a cache. Correspondingly, then, there is less of a need to store this cache locking information in translation table 440, and further reductions in hardware requirements may be achieved by devoting only certain lines within translation table 440 to storing the real address and attributes of data locked in a cache.

Figure 6:
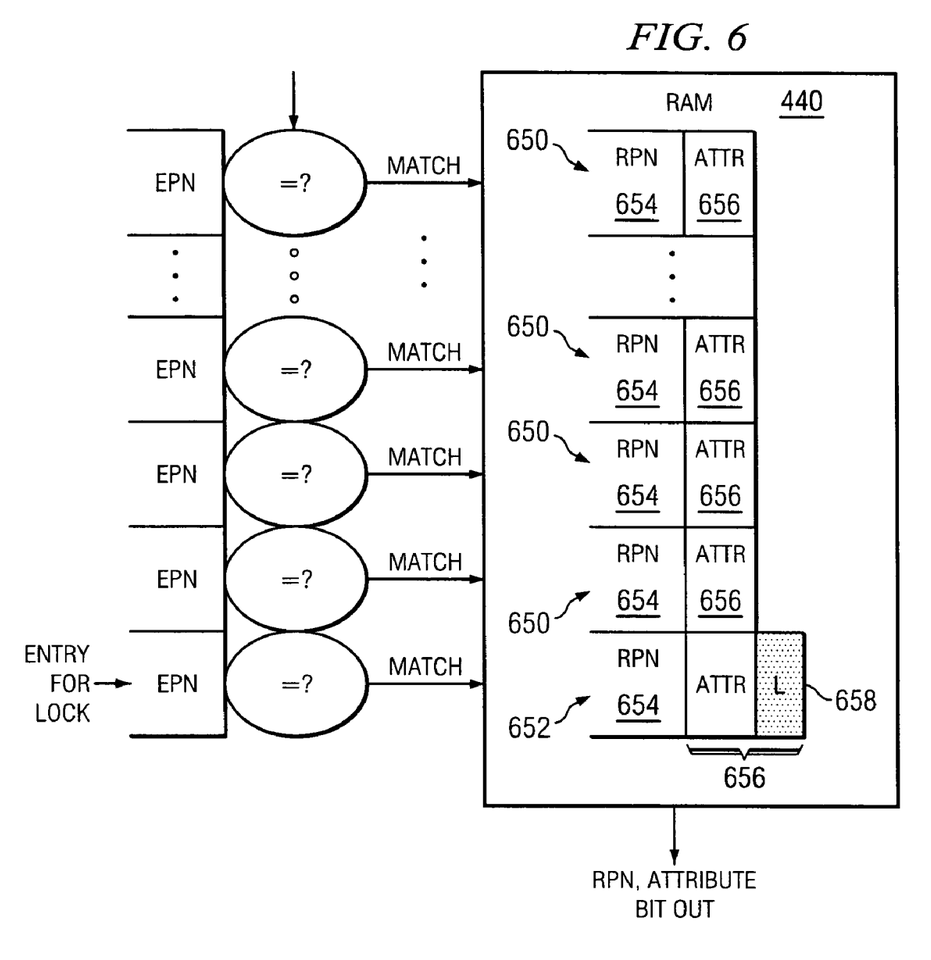
FIG. 6 depicts a block diagram of one embodiment of a translation table.

FIG. 6 illustrates one embodiment of such a translation table. Translation table 440 may be a content addressable memory comprising a set of entries 650, 652 capable of storing data. Each entry 650 may contain a real addresses 654 and corresponding attributes 656. Entry 652 also contains real address 654 and corresponding attributes 656. However, in entries 652, attributes 656, in turn, contain lock information 658, comprising bits pertaining to the locking of data corresponding to real address 654 of entry 652.

Thus, upon first receiving an EA and cache lock information from an instruction, translation table 440 loads information pertaining to this EA into entry 652. If an entry corresponding to the EA already exists in one of the other entries 650 of translation table 440, the information in this entry may be moved or copied to line 652. Additionally, upon loading line 652 with information, this entry 652 may be locked within translation table 440, as described above. Subsequently, when translation table 440 receives EA on input line the information from line 552 is output on output line.

It will be understood by those of skill in the art that similarly to the embodiment described with respect to FIG. 5, if no match is found to the EA, at least a portion of translation table 440 may be reloaded, with the RA corresponding to the EA loaded into entry 652. Upon reloading translation table 440, cache lock information 658 of reloaded entry 652 matching EA is set such that data corresponding to the RA loaded into entry 652 will be locked in a cache. Alternatively, translation table 440 may automatically reload every line in translation table 440 if no match is found to the EA. This automatic reload may, in turn, be initiated by an exception that is taken when no match to the EA provided by the instruction is found in translation table 440.

Returning now to FIG. 4, the RA generated by translation table 440 is then stored in cache miss transaction pipeline 452 along with its corresponding EA. Information from entries in cache miss transaction pipeline 452 can then be placed in load/miss queue 470 or store queue 480 of interface queues 484 (depending on the type of instruction which originally referenced the EA) to be processed by L2 cache mechanism 490. Entries within load/miss queue 470 and entries in store queue 480 consist only of an RA and lock information corresponding to the RA. From load/miss queue 470 or store queue 480, an RA and corresponding lock information may be sent to L2 cache mechanism 490.

Figure 7:
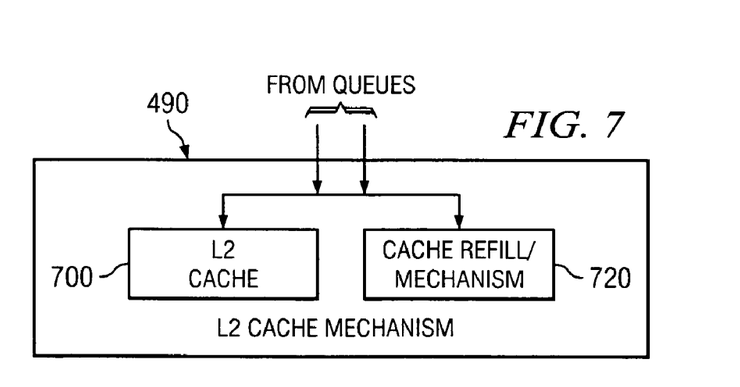
FIG. 7 depicts a block diagram of one embodiment of a cache mechanism.

FIG. 7 depicts one embodiment of an architecture for L2 cache mechanism 490. L2 cache mechanism 490 comprises L2 cache 700 and L2 cache refill/miss mechanism 720. L2 cache 700 may store data and L2 cache refill/miss mechanism 720 may implement a replacement policy for L2 cache 700. Thus, cache mechanism 490 may implement an L2 cache capable of locking data. If L2 cache mechanism 490 receives a real address from store queue 480, data corresponding to this real address may be stored in L2 cache 700. If the lock information indicates that this data is to be locked in L2 cache 700 this lock information may be stored in L2 cache refill mechanism 720. Conversely, if L2 cache mechanism 490 receives an RA and associated lock information from load/miss queue 470, L2 cache 700 may be checked for data corresponding to the RA and if data is found the data can be returned to the requesting instruction. If matching data is not found in cache 700, data corresponding to the real address can be loaded into cache 700 from main memory by L2 cache refill mechanism 720. When this data is loaded into L2 cache 700 if the received lock information indicates that data associated with the RA is to be locked this lock information may be stored in L2 cache refill/miss mechanism 720.

In most cases, cache 700 is full, consequently to load data corresponding with the RA into the cache L2 cache replacement/miss mechanism 720 may implement a replacement policy to determine which entry in cache 700 to replace with the data to be loaded. Cache refill mechanism 720 decides on an entry within cache 700 to be replaced. Cache refill mechanism/miss 720 can then check lock information associated with the selected entry. If the lock information of the selected entry indicates that the entry is to remain locked, cache refill/miss mechanism 720 may select another entry within cache 700 to be replaced, thus lock information associated with a cache entry can override the replacement policy of cache refill/miss mechanism 720, whether that replacement policy be least recently used (LRU), most recently used (MRU) etc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for efficient cache locking, comprising:
   a translation table comprising a set of entries, wherein the translation table is operable to store cache lock information corresponding to an entry in the set of entries, wherein the cache lock information is used for locking cache entries;
   a cache operable to store at least one of an instruction and data; and
   a queue coupled between the translation table and the cache, operable to store a physical address and the cache lock information from the translation table.

2. The system of claim 1, wherein the translation table is operable to store cache lock information corresponding to every entry in the set of entries.

3. The system of claim 2, further comprising:
   control logic, operable to implement a replacement policy for the cache.

4. The system of claim 3, wherein the control logic is operable to override the replacement policy based on the cache lock information.

5. The system of claim 4, wherein the replacement policy is a least recently used (LRU) replacement policy.

6. The system of claim 3, wherein the translation table is responsive to an instruction referencing a virtual address.

7. The system of claim 6, wherein the translation table is operable to set the cache lock information corresponding to one of the set of entries in response to the instruction, if the virtual address corresponds to the one of the set of entries.

8. The system of claim 7, wherein a configuration register is responsive to the instruction.

9. The system of claim 7, wherein the translation table is operable to store translation table lock information corresponding to one or more entries in the set of entries.

10. The system of claim 9, wherein the translation table is operable to set the translation table lock information corresponding to the one of the set of entries in response to the instruction, if the virtual address corresponds to the one of the set of entries.

11. The system of claim 10, wherein the translation table is operable to set the translation table lock information corresponding to the one of the set of the entries, if the one of the set of the entries is invalidated.

12. The system of claim 7, wherein the translation table is operable to refill if the virtual address does not correspond to any of the set of entries.

13. The system of claim 12, wherein the system is operable to generate an exception if the virtual address does not correspond to any of the set of entries.

14. A system for efficient cache locking, comprising:

a translation table comprising a set of entries, wherein the translation table is operable to store cache lock information corresponding to the entry, wherein the cache lock information is used for locking cache entries;

a cache operable to store at least one of an instruction and data associated with one or more entries in the set of entries;

a queue coupled between the translation table and the cache, operable to store a physical address and the cache lock information from the translation table; and control logic, operable to implement a replacement policy for the cache, wherein the control logic is operable to override the replacement policy based on the cache lock information.

* * * * *